United States Patent
Qi

(10) Patent No.: US 12,489,571 B2
(45) Date of Patent: Dec. 2, 2025

(54) METHODS AND APPARATUS FOR ENHANCING THE CONFIGURABILITY OF 5G NEW RADIO POSITIONING REFERENCE SIGNALS

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 879 days.

(21) Appl. No.: 17/429,506

(22) PCT Filed: Feb. 12, 2020

(86) PCT No.: PCT/KR2020/001979
§ 371 (c)(1),
(2) Date: Aug. 9, 2021

(87) PCT Pub. No.: WO2020/166971
PCT Pub. Date: Aug. 20, 2020

(65) Prior Publication Data
US 2022/0014329 A1 Jan. 13, 2022

(30) Foreign Application Priority Data
Feb. 15, 2019 (GB) .................. 1902156

(51) Int. Cl.
*H04L 5/00* (2006.01)
*H04W 64/00* (2009.01)
(Continued)

(52) U.S. Cl.
CPC .......... *H04L 5/0048* (2013.01); *H04L 5/0023* (2013.01); *H04W 72/0446* (2013.01); *H04W 72/046* (2013.01); *H04W 64/00* (2013.01)

(58) Field of Classification Search
CPC .................................................. H04L 5/0048
See application file for complete search history.

(56) References Cited

U.S. PATENT DOCUMENTS

2014/0185476 A1* 7/2014 Gomadam ............. H04B 7/024
370/252
2018/0124787 A1* 5/2018 Wang .................... G01S 5/0236
(Continued)

FOREIGN PATENT DOCUMENTS

WO 2017/029213 A1 2/2017

OTHER PUBLICATIONS

3GPP TSG RAN WG1 Ad-Hoc Meeting 1901, Taipei, Taiwan, Jan. 21-25, 2019; R1-1900512; Source: Intel Corporation Title: Analysis of Techniques for NR DL Positioning; Agenda item:7.2.10.1.1 (Year: 2019).*

(Continued)

*Primary Examiner* — Abdeltif Ajid
(74) *Attorney, Agent, or Firm* — Jefferson IP Law, LLP

(57) ABSTRACT

A method for transmitting a positioning reference signal, PRS, by a base station operating a cell in a 5G New Radio, NR, wireless communication system. The method comprising: determining a resource allocation from time and frequency resources of the cell for the transmission of the PRS; and transmitting the PRS using the determined resource allocation.

16 Claims, 3 Drawing Sheets

(51) Int. Cl.
  *H04W 72/044*  (2023.01)
  *H04W 72/0446*  (2023.01)

(56) References Cited

U.S. PATENT DOCUMENTS

| | | | |
|---|---|---|---|
| 2020/0214082 A1* | 7/2020 | Luo | H04W 76/28 |
| 2020/0245372 A1* | 7/2020 | Lei | H04L 5/0085 |
| 2020/0259521 A1* | 8/2020 | Zhao | H04B 1/7136 |
| 2021/0282111 A1* | 9/2021 | Yamada | H04L 5/0051 |
| 2021/0328747 A1* | 10/2021 | Da | H04L 5/0058 |
| 2022/0116089 A1* | 4/2022 | Khoryaev | H04W 64/00 |
| 2023/0412336 A1* | 12/2023 | Cha | H04L 1/08 |

OTHER PUBLICATIONS

LG Electronics, "Discussions on DL only based Positioning," 3GPP TSG RAN WG1 Ad-Hoc Meeting 1901, R1-1900629, Taipei, Taiwan, Jan. 21-25, 2019.
Intel Corporation, "Analysis of Techniques for NR DL Positioning," 3GPP TSG RAN WG1 Ad-Hoc Meeting 1901 R1-1900512, Taipei, Taiwan, Jan. 21-25, 2019.
Samsung, "DL only based Positioning, " 3GPP TSG RAN WG1 WG1 Ad-Hoc Meeting 1901 R1-1901090, Taipei, Taiwan, Jan. 21-25, 2019.
3GPP; "TSG RAN; E-Utra; Physical channels and modulation (Release 15)," 3GPP TS 36.211 V15.4.0.

\* cited by examiner

[Fig. 1]
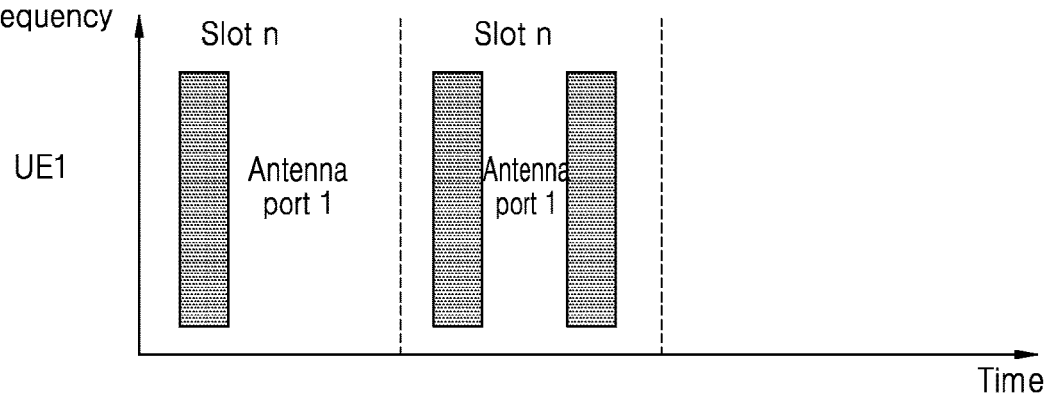
[Fig. 2]
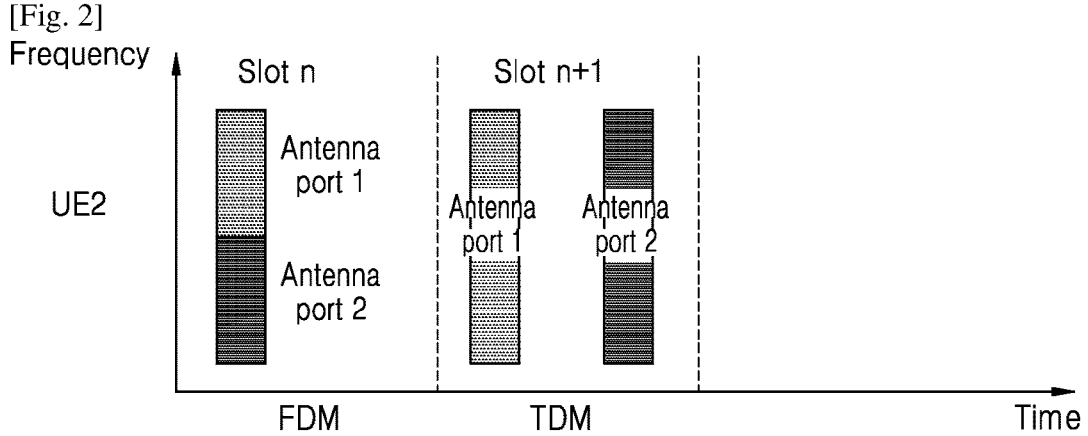
[Fig. 3]
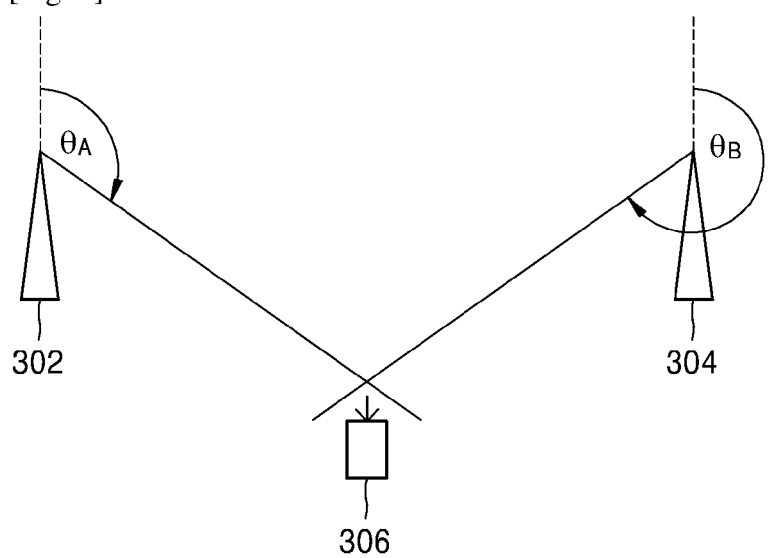

[Fig. 4]
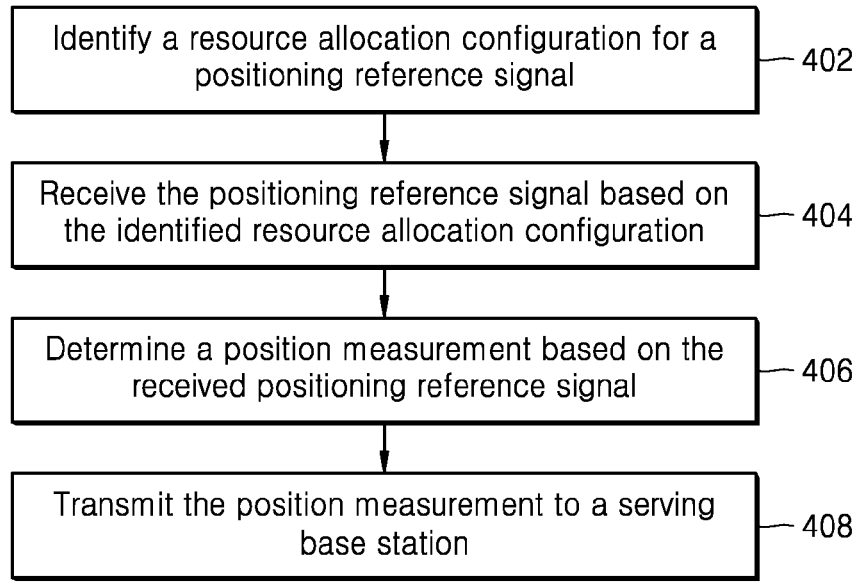
[Fig. 5]
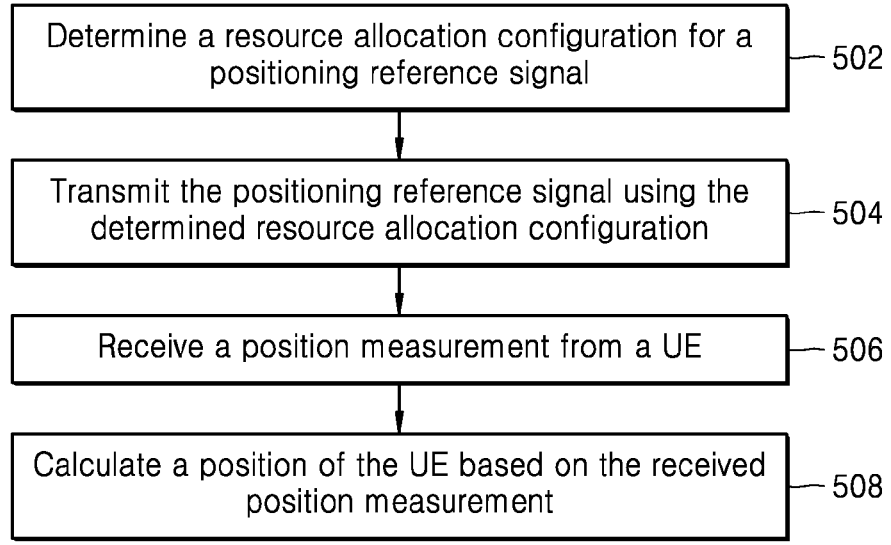
[Fig. 6]
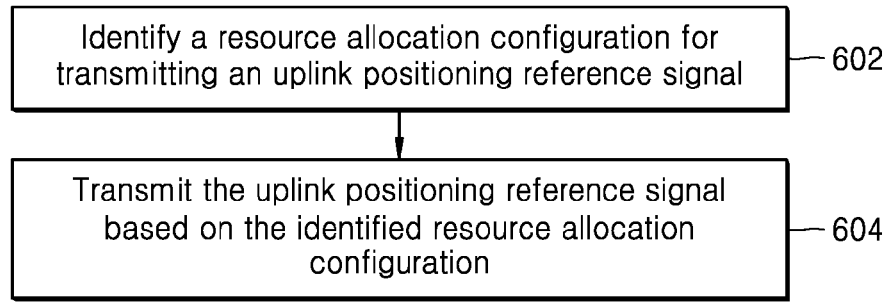

[Fig. 7]
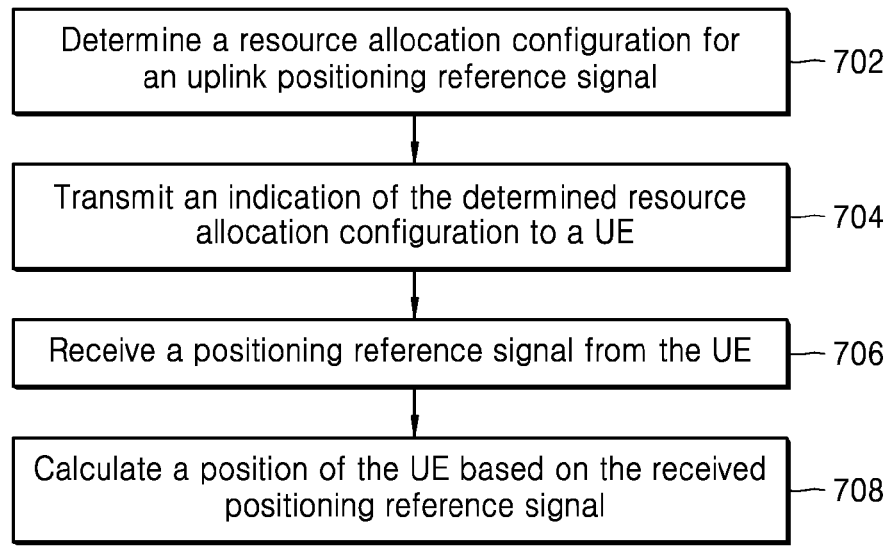
[Fig. 8]
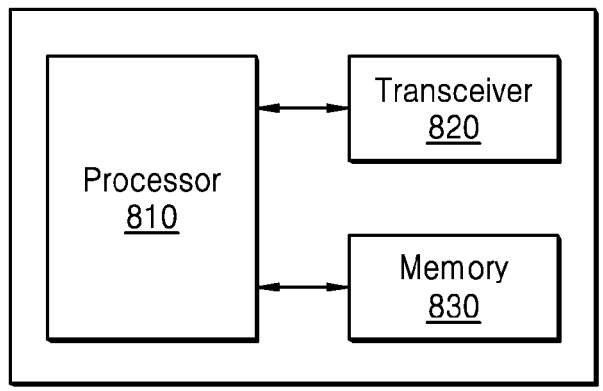
[Fig. 9]
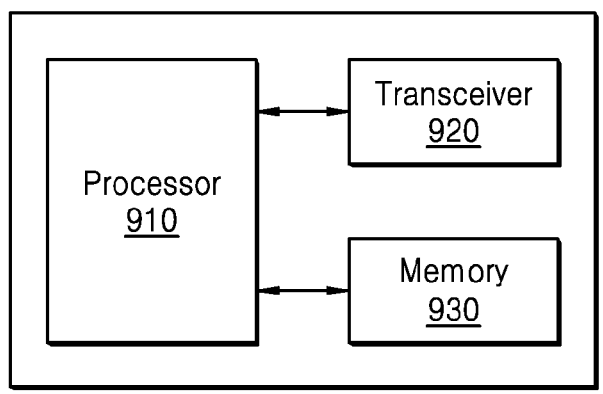

METHODS AND APPARATUS FOR ENHANCING THE CONFIGURABILITY OF 5G NEW RADIO POSITIONING REFERENCE SIGNALS

TECHNICAL FIELD

The present disclosure relates to methods and apparatus for transmitting and receiving positioning reference signals in a 5G New Radio (NR) network.

BACKGROUND ART

To meet the demand due to ever-increasing wireless data traffic after the commercialization of the 4th generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as things transmit, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that generate a new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

DISCLOSURE OF INVENTION

Solution to Problem

According to an aspect of the present disclosure there is provided a method for transmitting a positioning reference signal, PRS, by a base station operating a cell in a 5G New Radio, NR, wireless communication system. The method comprises determining a resource allocation from time and frequency resources of the cell for the transmission of the PRS; and transmitting the PRS using the determined resource allocation.

BRIEF DESCRIPTION OF DRAWINGS

Embodiments of the present disclosure are further described hereinafter with reference to the accompanying drawings, in which:

FIG. 1 illustrates an example antenna port mapping for transmitting positioning reference signals in a 5G NR system;

FIG. 2 illustrates an example antenna port mapping for transmitting positioning reference signals in a 5G NR system;

FIG. 3 illustrates an example Angle of Arrival (AoA)/Angle of Departure (AoD) based positioning technique;

FIG. 4 illustrates an example method for receiving positioning reference signals by 5G NR UE;

FIG. 5 illustrates an example method for transmitting positioning reference signals by a 5G NR gNB;

FIG. 6 illustrates an example method for transmitting positioning reference signals by a 5G NR UE;

FIG. 7 illustrates an example method for receiving positioning reference signals by a 5G NR gNB;

FIG. 8 illustrates an example structure of a 5G NR gNB, and

FIG. 9 illustrates an example structure of a 5G NR UE.

MODE FOR THE INVENTION

It is an aim of certain examples of the present disclosure to address the issue of improving the configurability of positioning reference signals in 5G New Radio (NR).

According to a first aspect of the present disclosure there is provided a method for transmitting a positioning reference signal, PRS, by a base station operating a cell in a 5G New Radio, NR, wireless communication system. The method comprises determining a resource allocation from time and frequency resources of the cell for the transmission of the PRS; and transmitting the PRS using the determined resource allocation.

In an example of the present disclosure the cell resources are divided into resource blocks of a predetermined size in time and frequency, and the resource allocation is based on a minimum resource allocation of one of a partial resource block, a single resource block, and a group of resource blocks.

In an example of the present disclosure transmitting the PRS includes transmitting the PRS using at least one of an orthogonal cover code, an interleaving pattern, a scrambling code, and power adjustment.

In an example of the present disclosure transmitting the PRS includes periodically transmitting the PRS in the determined resource allocation.

In an example of the present disclosure determining the resource allocation and transmitting the PRS are performed in response to a request received by the base station from a terminal device served by the cell.

In an example of the present disclosure, the method further comprises transmitting data and/or control signals to one or more terminal devices served by the cell, wherein the PRS is transmitted at a higher power than the data and/or control signals.

In an example of the present disclosure the method further comprises transmitting data and/or control signals to one or more terminal devices served by the cell, wherein the PRS the data and/or control signals are spatially multiplexed.

In an example of the present disclosure the base station is configured to transmit signals to terminal devices of cell using one or more beamformed beams, and the PRS is transmitted using a first beamformed beam, and wherein the method further comprises transmitting data and/or control signals to one or more terminal devices served by the cell using a second beamformed beam different to the first beamformed beam.

In an example of the present disclosure the cell resources are divided into one or more channels, including a broadcast channel, and the method further comprises transmitting an indication of the determined resource allocation through the broadcast channel before the transmission of the PRS.

In an example of the present disclosure the determined resources vary in position in frequency according to a frequency hopping pattern.

In an example of the present disclosure the determined resources are within a predetermined frequency band within the frequency resources of the cell.

In an example of the present disclosure the method further comprises transmitting one or more further PRS in the determined resources.

In an example of the present disclosure the PRS is transmitted in accordance with a predetermined pattern.

In an example of the present disclosure the PRS is transmitted using OFDM symbols including a cyclic prefix, and wherein the cyclic prefix of the PRS symbols has a length that is a multiple of a default cyclic prefix length with which symbols are transmitted by the base station.

In an example of the present disclosure the base station configures a set of candidate resources for PRS, and the determining a resource allocation includes selecting a resource allocation from the set of candidate resources.

In an example of the present disclosure the base station configures multiple antenna ports for PRS and the initialization of a PRS sequence that forms of the PRS is dependent on an antenna port number associated with the PRS.

In an example of the present disclosure the base station configures a plurality of sets of candidate resources, and wherein each set of candidate resources is associated with a 5G NR PRS antenna port, and wherein a same PRS resource/ resource set can be configured with different antenna ports for different terminal devices.

According to a second aspect of the present disclosure there is provided a method for performing position determination in a 5G New Radio, NR, communication network by a terminal device in a cell operated by a base station of the 5G NR communications network, the method comprising identifying a resource allocation of the time and frequency resources of the cell for transmission of a positioning reference signal, PRS, by the base station; receiving the PRS based on the identified resource allocation configuration; and determining a position measurement based on the received PRS.

In an example of the present disclosure the method further comprises transmitting the determined position measurement to the base station.

In an example of the present disclosure the PRS is periodically transmitted by the base station in the identified resources, and the method further comprises entering a reduced power mode, and periodically exiting the reduced power to receive the PRS, wherein the periodicity of exiting the reduced power mode corresponds to the periodicity of the PRS transmissions.

According to a third aspect of the present disclosure there is provided a base station configured to operate a cell in a 5G New Radio, NR, wireless communication system, where the base station is configured to perform the method of any of the first aspect and the related examples.

According to a fourth aspect of the present disclosure there is provided a terminal device configured to operate in a 5G New Radio, NR, wireless communication system, where the terminal device is configured to perform the method of any of the second aspect and the relates examples.

According to another aspect of the present disclosure there is provided a computer readable storage medium having stored thereon computer executable instructions which when executed by a computer cause the computer to perform any of the above methods.

Another aspect of the present disclosure provides a computer program comprising instructions arranged, when executed, to implement a method and/or apparatus in accordance with any one of the above-described aspects and relates examples. A further aspect provides machine-readable storage storing such a program.

Wireless or mobile (cellular) communications networks in which a mobile terminal (UE, such as a mobile handset) communicates via a radio link with a network of base stations, or other wireless access points or nodes, have undergone rapid development through a number of generations. The 3 rd Generation Partnership Project (3GPP) design, specify and standardise technologies for mobile wireless communication networks. Fourth Generation (4G) systems are now widely deployed.

3GPP standards for 4G systems include an Evolved Packet Core (EPC) and an Enhanced-UTRAN (E-UTRAN: an Enhanced Universal Terrestrial Radio Access Network). The E-UTRAN uses Long Term Evolution (LTE) radio technology. LTE is commonly used to refer to the whole system including both the EPC and the E-UTRAN, and LTE is used in this sense in the remainder of this document. LTE should also be taken to include LTE enhancements such as LTE Advanced and LTE Pro, which offer enhanced data rates compared to LTE.

The trend towards greater data throughput continues with 3GPP currently working to standardise Fifth Generation (5G) network technologies. As part of this, a new air interface is being developed, which may be referred to as 5G New Radio (5G NR) or simply NR. NR is designed to support the wide variety of services and use case scenarios envisaged for 5G networks, though builds upon established LTE technologies. One aspect of NR is the provision of enhanced positioning techniques for determining the positions of both user equipment (UE) and next generation Node Bs (gNBs), where the position of UEs and gNBs is required at least for effective beamforming but also for the provision of location dependent services. Whilst Positioning Reference Signals (PRS) are utilised in LTE and LTE Advanced, the configuration of these PRS is required to be enhanced or new positioning signals defined if the advantages of position-dependent functionality in 5G NR are to be achieved.

Examples in accordance with the present disclosure will now be described in the context of a 5G wireless communication network, and in particular a New Radio (NR) radio access network forming part of a 5G wireless communication network. It will be understood that the present disclosure is not limited to any particular radio access technology. That is, the use of and configuration of Positioning Reference Signals (PRS) or other signals used for position determination at either the UE (i.e. portable terminal/terminal device) side or network side (i.e. base station/gNB) are equally applicable in other wireless communication systems where it is desirable to determine accurate positioning information of a UE and/or base stations such that improvements in system performance and new location dependent functionality can be provided. References to particular 3GPP constructs in certain examples should not be understood as limiting the ability of examples of the present disclosure to be applied to other wireless communication networks.

In 5G NR, and more generally LTE and LTE Advanced systems, approaches to position determination may be separated into three different categories: Radio Access Network (RAN)-dependent techniques, RAN-independent techniques and hybrid techniques, which utilise a combination of the two former techniques in order to complement their operation. RAN-dependent techniques are those that utilise information provided by or derived from signals of the RAN, for example, position information may be determined based on Cell-IDs, E-Cell IDs, Observed Time Difference of Arrival (OTDOA), Uplink Time Difference of Arrival (UTDOA), Angle of Departure (AoD), Angle of Arrival (AoA); and RAN-independent techniques are that utilise information and signals external to the RAN, for example GNSS, Bluetooth, WLAN, Terrestrial Beacon Systems (TBS). From these approaches, there is an effort to improve the capabilities of the RAN-dependent techniques so as to provide increased accuracy position determination. In particular, improved approaches to the use of technique based upon signal detection and analysis are sought, in other words techniques such as OTDOA, UTDOA, AoD, and AoA. Consequently, there is a requirement for enhancing the configurability of the reference signals used for the RAN-dependent positioning functionality in 5G NR systems.

In LTE and LTE Advanced, RAN-dependent position determination using techniques such as OTDOA, UTDOA, AoD, and AoA are dependent on the receipt of reference signals, or more precisely, Positioning Reference Signal(s) (PRS) in the downlink and Sounding Reference Signal(S) (SRS) in the uplink. These reference signals take the form of pseudo random sequence QPSK signal that is generated based on parameters including one or more of physical layer cell identity, slot number, OFDM symbol number, cyclic prefix, antenna port etc. PRS were introduced in 3GPP LTE Release 9 and therefore further details on PRS can be found in 3GPP TS 36.211 version 9.1.0 Release 9 (30 Mar. 2010). Uplink-based positioning was introduced in 3GPP LTE Release 11, where such positioning is based upon Sounding Reference Signals (SRS), further details on which can be found in 3GPP TS 36.211 version 11.7.0 Release 11 (23 Mar. 2017).

In 5G NR it is envisaged that position functionality may be based on an evolved form of the LTE PRS, NR CSI-RS/TRS, or a new form of reference signalling, with some preliminary details set out in 3GPP TS 36.211 version 15.4.0 Release 15 (11 Jan. 2019) and 3GPP TR 38.855 Release 16 (19 Dec. 2018). In LTE, when a normal cyclic prefix is used, the PRS pattern is generated based on the following equation $$k = 6(m + N_{RB}^{DL} - N_{RB}^{PRS}) + (6 - l + v_{shift}) \bmod 6$$

$$l = \begin{cases} 3, 5, 6 \text{ if } n_s \bmod 2 = 0 \\ 1, 2, 3, 5, 6 \text{ if } n_s \bmod 2 = 1 \text{ and}(1 \text{ or } 2PBCH \text{ antenna ports}) \\ 2, 3, 5, 6 \text{ if } n_s \bmod 2 = 1 \text{ and}(4 \ PBCH \text{ antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

The parameter $v_{shift}$ accounts for different eNBs and up to 6 eNBs can be accommodated, generating different diagonal patterns of PRS so the PRS from neighbouring eNBs do not interfere with one another.

In the following description, although downlink PRS (DL PRS) are predominantly referred to, the characteristics, configurations and implementation details of the various aspects of 5G NR position determination configuration are not limited to only PRS but are equally applicable to other forms of signals utilised for position determination such as Uplink PRS/SRS or other forms of position reference signalling.

Observed Time Difference of Arrival Positioning

As set out above, numerous different approaches may be used to determine the position of a UE in 5G systems. However, observed time difference of arrival (OTDOA) is likely to be commonly used in conjunction with downlink PRS. OTDOA of arrival operates by measuring the difference in arrival times between reference signals (e.g. downlink PRS) received from multiple transmissions points, which in the case of 5G NR will be gNBs. For example, the arrival time of reference signals from three gNBs will be measured and then a relative arrival time (i.e. observed time difference) will be calculated relative to one of the gNBs, such as the serving gNB for example. The relative arrival times are then transmitted to the serving gNB which can then calculate the position on of the UE based on upon the received measurements and its own location information using a hyperbolic multilateral algorithm. However, in some examples the UE may calculate a position from the relative arrival times. More precisely, taking $t_1$ to be the arrival time of the PRS signal from the $gNB_1$, $t_2$ to be the arrival time of the PRS signal from $gNB_2$ and $t_3$ to be the arrival time of the PRS signal from $gNB_3$ the UE calculates the observed time differences of arrival ($t_{2,1}=t_2-t_1$ and $t_{3,1}=t_3-t_1$) and transmits them to the serving gNB (e.g. $gNB_1$). These calculated values define two hyperbolas, the intersection of which provide the position of the UE. An equivalent procedure may also be performed in the uplink (i.e. UTDOA) based upon uplink reference signals transmitted by the UE to a serving gNB and at least two neighbouring gNB s.

Angle of Arrival Measurement

In LTE and LTE Advanced, AoA may be measured in a number of ways at the eNB. For example, the Multiple Signal Classifier (MUSIC) algorithm can be applied to an antenna array at the eNB.

5G NR Positioning

In addition to increasing the accuracy of position determination in 5G NR compared to LTE and LTE Advanced, there are also a number of further aspects that require consideration. For example, positioning techniques should preferably be able to function in both 5G NR frequency ranges of FR1 (450 to 6000M Hz) and FR2 (>6 GHz/24250 to 52600 MHz), and be configurable so that they may operate over the many different network configurations that are envisaged in 5G NR systems. For example, positioning techniques should operate at the minimum 5G NR bandwidth of 5 MHz but be scalable to higher bandwidths; they should be applicable to Internet of Things (IoT) devices, and also support voice and data devices; they should be efficient and low complexity for the various use cases whilst preferably using a common architecture where possible. Given these desired requirements, positioning techniques with a large degree of configurability are required for 5G NR.

With respect to UE position determination, positioning signals may be transmitted by a 5G NR gNB or a UE, and it is the characteristics of these signals that are required to be configured in order to fulfil the various requirements set out above. These characteristics may include, among others, the content of the signal, the positioning (e.g. time and frequency resource allocations) of the signal in the physical resources, the repetition of the signal, the power/relative power of the signal, and the interference characteristics of the signal. This disclosure provides approaches for enhancing the configurability of the positioning signals and/or positioning techniques envisaged to be included in 5G NR systems.

5G NR is required to operate in a broad range of different scenarios, for example, indoor, outdoor, line-of-sight, non-line-of-sight, short-range, and long-range. Each of these scenarios have markedly different characteristics in terms of channels, bandwidth, frequencies, use cases etc., and therefore, as well as their positioning requirements varying, the configurations needed to provide the required level of positioning functionality will also vary. For example, the differing channels such as Urban Micro (UMi), Urban Macro (UMa), Rural Macro etc. will likely require different configurations of PRS. Consequently, the characteristics of PRS will be required to be configurable to these different scenarios. Likewise for example, in scenarios where a UE is distant to the gNB, transmission power of the positioning signals should be increased; in scenarios with a high degree of interference, a lower-density of signals may be required for orthogonality between PRS; and in scenarios where low latency in required, signals used for positioning may be transmitted more frequently.

Different scenarios may also include the type of devices that are being used. For example, low bandwidth devices (i.e. those with a small bandwidth part (BWP)) may require positioning signals to be transmitted in a narrow bandwidth. Likewise, devices that operate with differing OFDM sub-carrier spacings (SCS) may also require specific arrangements of positioning signals in frequency and time. Different scenarios may also have various requirements in terms of overheads and spectral efficiency and therefore PRS may also be required to be configured based on these requirements.

Given the requirements in terms of performance and configurability placed upon PRS in 5G NR systems, such signals may be placed into a newly defined category of signals. Existing reference signals in 5G NR have been defined by upper layers into categories based on specific use cases such as channel state information (CSI) acquisition, beam management, frequency and timing tracking, and mobility management. Consequently, given the specific purpose and importance of positioning in 5G NR, a new category of "Positioning" may be defined thus enabling easier configuration of these specific positioning signals, where the characteristics of signals in this category may be defined by upper layers, using for example LTE positioning Protocol (LLP), Radio Resource Control (RRC), Medium Access Protocol Control Element (MAC CE).

Approaches in accordance with the present disclosure by which specific characteristics of positioning reference signals in 5G NR systems may be configured are set out below.

Granularity of Resource Allocation

As set out above, the configuration of PRS within the time/frequency resources of a 5G NR system cell will be required to be highly flexible. In accordance with an example of the present disclosure, this may be achieved by providing PRS that have an adaptable granularity i.e. the minimum allocation of resources may vary. For example, in accordance with the present disclosure, each instance of PRS (i.e. a PRS pattern) may be transmitted in resources allocated based on one or more of the following granularities a partial resource block (RB) (e.g. 4/6 subcarriers)

a full RB multiple (K) RBs i.e. RB group (RBG) based, where K=2, 4 etc and RBG size may be changed by scheduling. For granularity, a minimum RBG size of 2 may be considered These different granularities may enable more flexible allocation of resources to PRS such that the scheduling of PRS can be adapted to the requirements of the UEs currently being served by an gNB.

Differing comb patterns may also be combined with the various PRS granularities in order to allow for more adaptable distribution of PRS in both frequency and time. For example, for partial resource blocks a 4/6 comb pattern may be used. However, a comb pattern can also be introduced in RB level granularity, which may allow non-consecutive PRS resource mapping in frequency domain to be supported to allow the UE to receives/transmit orthogonal PRS from/to more than one gNB. Similarly, when RBG level granularity is used, one RB out of two consecutive RBs in the RBG may be occupied with PRS from a first gNB and the other RB in the RBG may be for transmission of a PRS form another gNB.

As is explained in more detail below, allocation of resources to PRS may be determined by the serving gNB and/or the serving gNB in cooperation with neighbouring gNBs. The signalling of the allocated resources to a UE may be performed via higher layer signalling or using Downlink Control Information (DCI) for example.

Cyclic Prefix

In accordance with an example of the present disclosure, PRS signals may include a cyclic prefix in order to mitigate against interference such as inter symbol interference (ISI) that results from signal delay spread. Such a cyclic prefix may take a normal (i.e. default) value but may also be extended in order to mitigate against increased ISI that may occur due to the distances over which PRS may be received from neighbouring gNBs. In accordance with one example, a PRS CP may be extended by multiples of one to eight times; however, any multiple may be chosen. Furthermore, the specific pattern/density with which PRS are transmitted may be varied depending on the CP length configured for the PRS. For example, the density of PRS may be changed when higher multiples of CP are used.

PRS Resource Allocation

In accordance with the present disclosure, resource allocation for PRS signals may be divided into two general categories in order to increase the flexibility of such allocation: periodic and non-periodic (e.g. on-demand/semi-persistent/aperiodic).

In periodic allocation, resources may be periodically allocated to the transmission of PRS so that a fixed amount and identity of resources are allocated to the transmission of PRS by a gNB per period of time. The periodic resource allocation may be explicitly configured by upper layers e.g. LPP/RRR/MAC CE or the periodicity can be broadcast in system information (e.g. in the physical broadcast channel (PBCH)). Alternatively, details of the periodic resource allocation may be implicitly determined based on characteristics of the system/cell, for example, bandwidth, gNB type etc (i.e. cell-specific configuration), with the required configuration hardcoded into a UE or provided upon registering with a 5G NR network. In some examples, a combination of two of these allocation mechanisms may be used. Although the overheads associated with the periodic allocation of resources to PRS transmission is likely to be relatively low since frequent signalling providing details on the allocation may not be required, in some scenarios, the regular transmission of PRS may not be required and therefore periodic transmission of PRS may lead to the transmission of unnecessary PRS, which in turn may reduce the useful throughout of the system.

Alternatively, resources for the transmission of PRS may be allocated on a non-periodic manner. Resources for PRS that are not periodic may be configured via several different approaches, including PRS resources being be allocated on a per UE basis or a group basis, with control signalling provided by physical downlink control channel (PDDCH) or upper layer signalling. Alternatively, resources may be allocated to the transmission of PRS in response to a request from the UE, based on characteristics of the system/UE e.g. allocated bandwidth/beam information, the characteristic of a group of UEs (e.g. BWP, power requirements, location accuracy), or a combination of any of these approaches. In other examples, resources for PRS may be not periodically allocated but when PRS are transmitted, they are transmitted within fixed set of resources.

Both periodic and non-periodic configurations may be enabled at the same time by a gNB or group of gNBs, depending on the positioning requirements of the UEs in their respective cells. In the case of non-periodic configuration, a triggering signalling is needed, where the triggering signalling may be included in upper layer signalling, may be provided in a semi-static way or via dynamic signalling e.g. DCI, or provided via a UE request. Furthermore, different PRS density/patterns can be configured for periodic configuration and non-periodic configurations, respectively in order to reflect the varying demands there may be on the resources of the cell and the positioning requirements of the UEs being served.

In scenarios where both periodic and non-periodic approaches are simultaneously enabled, collisions may be reduced by the puncturing or shifting of PRS. Alternatively, one of the approaches may be configured to override the other, for example, non-periodic PRS transmission (e.g. on-demand PRS) may override periodic PRS.

Resource Sharing

In order to improve the hearability of PRS received at a UE from various gNBs, and in particular those transmitted from neighbouring cells (i.e. reducing inter-cell interference), in an example of the present disclosure, resources for PRS transmission may be configured such that PRS transmissions from neighbouring gNBs are allocated resources that do not overlap in frequency and/or time. Consequently, in some examples, PRS resource allocation may be performed jointly between gNBs; however, such an approach may lead to additional complexity and/or be overly restrictive on resource configuration. Alternatively, PRS patterns and their placement in frequency and/or time may be adapted to reduce the likelihood of overlap.

Alternatively, or when it is not possible ensure time/frequency orthogonality between PRS resources, resource allocations may be configured to randomize the interference for the overlapping PRS transmissions between gNBs. In particular, in accordance with the present disclosure, one or more of the steps set out below may be taken to increase the orthogonality or randomness of the PRS transmissions in order to reduce the likelihood of interference or at least reduce the likelihood of persistent interference between PRS transmissions.

Time and/or frequency domain Orthogonal Cover Codes (OCC) can be applied to PRS based on cell ID/UE ID/PRS resource ID/PRS sequence ID PRS from different cells can be interleaved with different interleaving patterns based on cell ID/UE ID/PRS resource ID/PRS sequence ID A scrambling code can be applied to PRS based on cell ID/UE ID/PRS resource ID/PRS sequence ID The transmission power of interfering PRS can be adjusted.

As well as interference between PRS transmissions from different gNBs, interference may occur between data/control signal and PRS transmissions both within cells (i.e. intra cell) and between different cells (inter cell). With respect to the former, in accordance with an example of present disclosure, multiple transmission layers (e.g. MU-MIMO) may be used such that PRS and data/control transmissions are spatially separated (i.e. isolated in the spatial domain), or different, possibly widely separated beams are allocated to PRS and data/control transmission. Furthermore, for either of these possible approaches, power boosting may also be applied to the PRS or power reduction can be applied to the data/control in order to reduce the relative level of interference experienced by the PRS.

Alternatively, for inter-cell interference, some form of cooperation between the relevant gNBs may be used. For example Multiple, possible widely separated beams may be allocated to PRS and data/control transmission Power boosting can be applied to PRS of the neighbouring cells or power reduction can be applied for data/control in the serving cells so that the interference of data/control to PRS is reduced Data may only be allowed to be transmitted in neighbouring cells but not the serving cell In order to further reduce interference, conditions may also be placed on when resources may be shared either within or between cells. For example, sharing may be enabled based on cell measurements, e.g., interference level, such that sharing of resources is permitted depending on the interference level relative to a predetermined threshold. In particular, in one example, if the interference from a neighbouring cell is determined to be low, the neighbouring cell may be permitted to transmit PRS or data/control signalling in overlapping resources or vice versa.

PRS and Data Separation

On an intra-cell level, the separation of resources allocated for PRS and data/control transmission may be performed in a number of different manners. For example, PRS and data/control transmissions can be separated in frequency. In particular, PRS may be transmitted within a particular band in the cell in which the one or more requesting UEs may operate e.g. within each of their BWPs or a common BWP shared by these UEs. By following this approach, the resources allocated to UEs that do not currently require PRS may be left unchanged, thus reducing any adverse effects on the UEs that do not required PRS. Alternatively, spatial separation may be used to separate PRS and data/control transmissions within a cell. For example, in the MU-MIMO case, some beams can be used for a few UEs with beam alignments achieved already in previous communications e.g. Quasi-Co-Location (QCLed) with Physical Downlink Control Channel (PDCCH)/Physical Downlink Shared Channel (PDSCH) Demodulation Reference Signal (DMRS) or Synchronisation Signal Block (SSB) or Tracking Reference Signal (TRS).

PRS Resource Sets

In some examples of the present disclosure, PRS resources may be formed into sets e.g. K resources within the range 1 to 64. One resource set can be within one slot/subframe or across multiple slots/subframes. The number of PRS resources within one resource set may scale with carrier frequency, numerology, bandwidth, etc., and a resource set may be non-consecutive so as to be multiplexed in time domain. In other words, within one resource set, the same or different PRS patterns can be configured to different PRS resources. In addition to this, it is assumed that only one antenna port can be assumed for each PRS resource and/or resource set, since, if multiple antenna ports are assumed, they might have different propagation delays, thus possibly leading to ambiguities in timing measurement.

Antenna Port Configuration

In accordance with the present disclosure, one or more antenna ports may be used for PRS transmissions, where the number of antenna ports may vary between 1 and 4, although they are not limited to only these values. The specific number of antenna ports may be configured by upper layers, e.g. LPP/RRC/MAC CE in a periodic or semi-persistent way. Alternatively, the number of antenna ports may be configured dynamically via DCI.

Different PRS resources can be configured to the same or different PRS antenna port(s) within one PRS resource set or between PRS resource sets as shown in FIG. 1.

Frequency Division Multiplexing (FDM), Time Division Multiplexing (TDM), Code Division Multiplexing (CDM), and Space Division Multiplexing (SDM) may also be supported for multiple PRS antenna ports. In some examples, the antenna port configuration may be UE specific so that some PRS resources/resource sets are configured to one UE with K antenna ports and the same PRS resources/resource sets are configured to another UE with L (different from K) number of antenna ports, e.g., K=1 but L=2, as show in FIG. 2.

However, it should be noted that a PRS resource set may not always need to be defined and in such a case, the PRS resource set mentioned above is actually a PRS resource or PRS resource set with a single PRS resource.

Furthermore, the PRS resource ID or PRS sequence ID may be required to take the antenna port number and/or ID into account, since the pseudo-random sequence generator for the PRS may be initialised with the PRS resource ID and/or PRS sequence ID, taking into account the antenna port ID. In accordance with one practical example where the number of antenna ports is 2, this may result in the following If antenna port 0, Nant=0

If antenna port 1, Nant=1

With such a procedure, the timing of two antenna ports may no longer be ambiguous and thus can be measured separately. Antenna ports can also be linked to a panel of antenna elements and in such a case, the above procedure to generate PRS sequence can alternatively take a panel ID into account.

Frequency Hopping

In some of examples of the present disclosure, frequency hopping may be used when transmitting the PRS in order to provide increased resilience against narrow band interference and fading channels. Frequency hopping may be particularly beneficial for devices with a narrow bandwidth, e.g., IoT or other low cost devices.

Frequency hopping may be enabled in certain cases where a bandwidth of a device is lower than a bandwidth threshold, with the required signalling possibly provided by upper layers, e.g., LPP/RRC/MAC CE. The bandwidth in which the PRS are transmitted may also be configured by upper layers with a minimum bandwidth B MHz, e.g., [B, 2B, 3B, . . . , 8B] MHz, where B may be a group of M RBs or a certain bandwidth value, e.g., 5 MHz, which can scale with numerology, system bandwidth, etc. The hopping position can be configured with respect to multiple pre-defined positions (e.g. K positions in the frequency domain in the range of [2, 32]) configured by upper layers and K can scale with numerology, system bandwidth, etc, where the K positions should preferably be uniformly distributed in the frequency domain. The first position in a frequency hopping routine may be pinned to the SSB or pinned to a central subcarrier of the entire system band, and the hopping duration cycle can be configured by upper layers and subsequently indicated to the UE. If the hopping is limited in the BWP, e.g. active BWP of a UE, the first position in a frequency hopping routine may be pinned to the central subcarrier of the BWP.

UE IDLE/INACTIVE State Positioning

In some scenarios, positioning may be needed when a UE is in RRC-IDLE/INACTIVE state (i.e. a reduced power state/mode) and/or when energy consumption of the UE is of higher importance. Consequently, in accordance with an example in accordance with the present disclosure, a periodic PRS can be used, where the periodicity is signalled to the UE such that it is able to wake and quickly and efficiently receive the PRS in order to perform a positioning routine. To ensure that the UE is able to correctly receive the PRS when it wakes, the wakeup periodicity should correspond to (i.e. be matched with) the PRS periodicity. For example, the wakeup periodicity may be K times of PRS periodicity, such that the UE can assume that PRS exists in a predetermined resource allocation when waking up.

With respect to the signalling of the periodic nature of the PRS to the UE, this may be performed by providing the relevant information via broadcast, so that the UE is not required to perform random access in order to obtain such information. Alternatively, the periodicity information may be provided by upper later signalling, such that the UE will be required to perform random access. However, once the periodicity value is obtained, it can be stored at the UE such that the UE does not need to do random access again for positioning until the current periodicity information expires or it is otherwise required to renew the periodicity information. In some examples, the UE may then perform positioning itself without further assistance from the serving gNB.

Uplink PRS

Up to this point, DL PRS has been predominantly considered. Whilst the foregoing configurations may also be applied to UL PRS, there are a number of configuration aspects which are specific to UL PRS.

In LTE and LTE Advanced, a UE transmits Sounding Reference Signals (SRS) to an eNB for the purposes of uplink channel estimation, timing estimation etc. The SRS may be classified as single, periodic, or aperiodic. In 5G NR the SRS may be used as a starting point for the operation of uplink PRS, although it would be desirable that uplink PRS in 5G NR has number of enhancements compared to LTE SRS in order enhance the functionality and operation of the reference signal transmissions. Details of LTE SRS can be found in 3GPP TS 36.211 Release 11 version 11.7.0 (23 Mar. 2017).

In accordance with the present disclosure, one such enhancement is to increase the orthogonality of SRS so that an increased number of SRS may be multiplexed onto a given set of resources. This may be achieved in a number of manners, including Increasing a comb pattern of the SRS from comb2 and comb4 to comb-k where k may be in the range of 6 to 12. Utilising a Resource Block Level Comb for SRS Increasing the number of reference signal symbols from 4 to k where k is in the range of 5 to 14.

In scenarios where the distance between the UE and one or more neighbouring cells is sufficiently large, SRS reception may overlap with adjacent signals even when a cyclic prefix is used. Consequently, in accordance with the present disclosure a guard period may be introduced before or after the transmission of the uplink PRS in order to reduce the level of overlap. Alternatively, the length of the cyclic prefix may be extended as set out above for DL PRS.

In some cases, UL PRS might not be constrained to only the active BWP due to accuracy requirements. For example, if higher accuracy is needed, UL PRS may be deployed outside the active BWP depending on UE capability.

Timing Advance of Uplink PRS

With respect to uplink PRS in 5G NR, it is likely that a timing advance will be required to be defined, and it is envisaged that the timing advance will be defined by the serving cell of a UE. However, uplink PRS i.e. SRS should preferably be heard by neighbouring cells as well if accurate positioning is to be achieved.

In accordance with the present disclosure, these requirements may be fulfilled via a number of alternative approaches. For example, in addition to the timing advance indicated by the serving cell, an additional offset may be configured to SRS resources/resource sets by upper layers e.g. LPP/RRC/MAC CE. Alternatively, separate timing advance values can be configured to different SRS resources/resource sets for different distances to the neighbouring cells. Lastly, an appropriate timing advance can be approximated by adding the timing advance of the serving cell and the timing difference between two cells e.g. the serving cell and the furthest cell that the SRS can be received and measured. A guard band may also be needed for above approaches.

Angle Based Positioning

Up to this point, geographical positioning has predominantly been considered as opposed to geographical orientation/direction e.g. North, South, East and West. However, accurate determination of the orientation of a UE and/or gNB is required to order to perform accurate beamforming and/to enhance the ToA based positioning techniques. AoA/AoD may also be used for geographical positioning of a UE as illustrated in FIG. 3. In particular, a first gNB 302 (e.g. gNB$_A$) measures angle $\theta_A$ using AoA/AoD and a second gNB 304 (e.g. gNB$_B$) measures angle $\theta_B$ using AoA/AoD and the location of the crossing point of the two lines following the angles $\theta_A$ and $\theta_B$ provides the position of the UE 306.

In angle-based positioning, beams can be used to estimate both AoA and AoD at the gNB and/or the UE. However, directions (i.e. beam directions) derived in this manner are relative to the particular device and therefore it may be difficult to link a beam direction to a geographical direction. For example, it may be known that beam with index i is the best transmission beam for UE i in the downlink, but this index merely indicates that the beam is pointing to the UE i and thus there is no information on which geographical direction this beam is pointing at, which is information of interest in this case. In other words, within the current beam management framework only relative beam directions can be established, such that there is a need for an approach to establish a link between beam index and geographic direction.

A first approach in accordance with the present disclosure that may be used to address this problem is to define a benchmark beam, where this benchmark beam points to a reference geographic direction, e.g., North. Subsequently, the actual directions of other beams can be derived from this benchmark beam and their own beam index.

A second approach in accordance with the present disclosure is to define a benchmark beam where there is a fixed angle between this benchmark beam and the reference geographic direction, e.g., North. The actual directions of other beams can then be derived from this benchmark beam and their own beam index.

The second approach may provide increased flexibility when forming the beam, which may be advantageous since these beams might not only be used for positioning but also for data transmission. The benchmark beam information as well as the beam index information should be signalled to the gNB in case of network based positioning or UE in case of UE based positioning.

Angle Based Positioning and RAT Independent Positioning

As previously set out, 5G NR positioning technologies can be categorized into RAN-embedded (Cell-ID, E-Cell ID, OTDOA, UTDOA, etc.), RAN-external (GNSS, Bluetooth, WLAN, Terrestrial Beacon Systems (TBS), sensors, etc.) and hybrid solutions where RAN-independent positioning techniques can be used to facilitate and/or improve the performance of RAN-dependent positioning techniques. Considering the proliferation of embedded functionality for positioning in smartphones/mobile devices, in addition to RAN-dependent techniques, the RAN-independent and hybrid positioning techniques may be useful in many scenarios.

Angle based measurement is normally performed at the network side in LTE based on UE transmission in the uplink with the knowledge of gNB antenna orientation and configuration. Angle based measurement accuracy scales with number of antenna elements at the receiver side. In this sense, given that NR gNBs are anticipated to include more antenna elements, it is expected that 5G gNBs will provide increased accuracy. Furthermore, more complex UEs with enhanced hardware (e.g. increase number of antennas) may be supported in 5G, which may also enable angle based measurement at the UE side possible.

However, despite this, angle measurement requires a priori knowledge of antenna array orientation. Without such information, only the angle relative to the antenna array orientation can be measured but not the actual angle relative to a pre-defined geographical direction which can then be used for angle based positioning. Such antenna array orientation information may be relatively easily obtained at the network side since the positions and antenna array orientation/configuration of the gNBs are rarely changed and thus may be determined at deployment for example. However, the antenna array orientation of UE can be easily changed due to movement or rotation of the UE and such information cannot be assumed to be known to the UE.

However, inertial measurement units (IMU) sensors consisting of one or more an accelerometer, a gyroscope and a compass are now commonly available in various UEs (e.g. smartphones) and can be used to measure the orientation of the UE devices. Consequently, measurements made using such a sensor can be combined with other RAT-dependent measurement such as arrival time difference to provide improved positioning accuracy and/or reduce positioning latency.

With respect to specific positioning approaches, for network based positioning, the measuring of UE orientation via IMU sensors or other sensors may be signalled to the gNB and then passed to positioning server via higher layer signalling, e.g., RRC, LPP, LPPa, etc. However, for UE based positioning, it may not be necessary to signal such a measurement to the network.

UE and gNB Operation

The various different configurable aspects of PRS and the resources used for their transmission set out above may be used to provide appropriate positioning functionality to the UEs of a 5G NR network. The specific resource configurations for the transmission of uplink and downlink PRS described above may be determined by one or more a serving gNB, a group of gNBs, and higher layer entities in the 5G network, and may be done for example, periodically, on-demand, or based on another suitable trigger.

FIGS. 4 to 7 described below illustrate the general operation of a UE and a gNB when implementing positioning functionality based on the any of the above-described configurations.

FIG. 4 provides a method of operation a UE when performing position measurement based on downlink PRS in accordance with an example of the present disclosure.

At step 402, the UE identifies resources that have been allocated to the transmission of the PRS. The identification may be based on information derived via one or more of the mechanisms described above, for example, the information may be received via higher layer signalling, received via DCI, received via a broadcast channel, or derived from characteristics of the cell and/or UE. The resource allocation has been configured by the serving gNB, possibly in conjunction with one or more gNBs, in accordance with one or more of the approaches set out above. The identified resources may be resources allocated to transmission of PRS for the serving gNB or the gNB and/or one or more other (i.e. neighbouring) gNBs.

At step 404, the UE receives the positioning reference signal via the resources identified in step 402. The receiving may include receiving PRS from the one or more gNBs the resource configuration of which were determined in step 102.

At step 406, once the PRS have been received, the UE determines a position measurement based upon the received PRS. For example, the UE may calculate the OTDOA of the received PRS.

At step 408, the UE transmits the determined position measurement to the serving gNB.

Although four steps have been illustrated in FIG. 4, in some examples one or more steps may be removed or separated in time, and in other scenarios additional steps may be introduced. For example, step 408 may not be necessary in scenarios where the UE itself is performing some form of location determination. Alternatively, one or more additional steps of receiving configuration information from the serving or neighbouring gNB, transmitting a request for transmission of PRS to the gNB, or receiving a calculated location from the serving gNB may be included for example, depending on one or more of: the specific implementation of the system, the characteristics of the UE, and the scenario that it is operating in.

FIG. 5 provides a method of operation a gNB (i.e. a base station) in accordance with an example of the present disclosure.

At step 502 the gNB determines a resource configuration for the transmission of PRS, where the resources may be configured in accordance with any of the approaches and considerations described above. In some examples, the configuration may be determined by higher layers or in conjunction with neighbouring gNBs.

At Step 504 the gNB transmits the PRS in the determined resources.

At step 506 the gNB receives a position measurement from a UE, where the position measurement is based upon the transmitted PRS and possibly PRS transmitted by one or more neighbouring gNBs.

At step 508, the gNB may calculate a position of the UE based on the received position measurement.

As set out for FIG. 4, in some examples, steps of FIG. 5 may be removed or separated in time, and in other scenarios additional steps may be introduced. For example, step 506 and 508 may not be necessary in scenarios where the UE itself is performing some form of location determination. Alternatively, one or more additional steps of receiving a request for transmission of PRS from a UE may be included depending on the specific implementation of the system and the characteristics of the UE and the scenario the UE is operating in.

FIG. 6 provides a method of operation of a UE when performing position measurement based on uplink PRS in accordance with an example of the present disclosure.

At step 602, the UE identifies a resource allocation configuration for transmitting an uplink positioning reference signal, such as described with reference to SRS above. The identification may be based on information received from the serving gNB via uplink control information and/or higher layer signalling.

At step 602, the UE transmits the uplink PRS in the identified resources.

Although only two steps have been set out in FIG. 6, one or more further or intermediate steps may be introduced. For example, the UE may receive an indication of resources allocation to uplink PRS transmission from a gNB. Also, the UE may subsequently, receive measurement information form the gNB based on the transmitted uplink PRS.

FIG. 7 provides a method of operation of a gNB when performing position measurement based on uplink PRS in accordance with an example of the present disclosure.

At step 702 the gNB determines a resource allocation configuration for the transmission of uplink PRS from a UE. The configuration may be determine based on any of above-described approaches.

At step 704 the gNB transmits an indication of the determined resource allocation to the UE.

At step 706 the gNB receives the uplink PRS transmitted by the UE in the allocated resources.

At step 708, the gNB calculates a position of the US based on the received position reference signal.

In some examples, steps of FIG. 7 may be removed or separated in time, and in other scenarios additional steps may be introduced. For example, one or more additional steps of receiving a request for resources for the transmission of uplink PRS from a UE or transmitting a calculated position to the UE may be included.

Although the methods illustrated by FIGS. 4 to 7 have been described in a general manner, each of the steps of the methods may be adapted and new steps introduced to implement the one or more of the various configurations that have been described in detail above.

FIG. 8 provides a schematic diagram of the structure of a gNB 800 which is arranged to operate in accordance with any of the examples described above.

Referring to the FIG. 8, the gNB 800 may include a processor 810, a transceiver 820 and a memory 830. However, all of the illustrated components are not essential. The user equipment 800 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the proposed function, process, and/or method. Operation of the gNB 800 may be implemented by the processor 810.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the device 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

FIG. 9 provides a schematic diagram of the structure of a UE 900 which is arranged to operate in accordance with any of the examples of the present disclosure described above.

Referring to the FIG. 9, UE 900 may include a processor 910, a transceiver 920 and a memory 930. However, all of the illustrated components are not essential. The UE 900 may be implemented by more or less components than those illustrated in FIG. 9. In addition, the processor 910 and the transceiver 920 and the memory 930 may be implemented as a single chip according to another embodiment.

The aforementioned components will now be described in detail.

The processor 910 may include one or more processors or other processing devices that control the proposed function, process, and/or method. Operation of the UE 900 may be implemented by the processor 910.

The transceiver 920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store the control information or the data included in a signal obtained by the UE 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

Although in FIGS. 8 and 9 the processor, transceiver, and memory have been illustrated as separate elements, any single element or plurality of elements which provide equivalent functionality may be used to implement the examples of the present disclosure described above.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. Examples of the present disclosure extend to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Methods according to embodiments of the disclosure described in claims or specification of the disclosure may be implemented as hardware, software, or a combination of hardware and software.

When implemented as software, a computer-readable storage medium or computer program product storing at least one program (software module) may be provided. The at least one program stored in the computer-readable storage medium or computer program product is configured to be executable by one or more processors in an electronic device. The one or more processors include instructions causing the electronic device to execute the methods according to embodiments of the disclosure described in the claims or the specification of the disclosure.

The at least one program (the software module, the software) may be stored in a nonvolatile memory including a random-access memory (RAM) and a flash memory, a read-only memory (ROM), an electrically erasable programmable read-only memory (EEPROM), a magnetic disc storage device, a Compact Disc-ROM (CD-ROM), Digital Versatile Discs (DVDs), other optical storage devices, a magnetic cassette, or the like, or a memory configured with any or all combinations thereof. Also, each of the configured memories may be provided in a multiple number.

The at least one program may be stored in an attachable storage device that can be accessed via a communication network including the Internet, an Intranet, a local area network (LAN), a wide LAN (WLAN), or a storage area network (SAN), or a combination thereof. The storage device may access, via an external port, an apparatus for performing embodiments of the disclosure. Also, a separate storage device on a communication network may access the apparatus for performing embodiments of the disclosure.

In the aforementioned embodiments of the disclosure, each element included in the disclosure is expressed in a singular form or a plural form according to the embodiments of the disclosure. However, for convenience of description, the expression in the singular form or the plural form is selected to be appropriate for a provided situation, and thus, the disclosure is not limited to the singular form or the plural form. Accordingly, even when an element is expressed in a plural form, the element may be configured in a singular form, and even when an element is expressed in a singular form, the element may be configured in a plural form.

While one or more embodiments of the disclosure have been described above with reference to the drawings, the embodiments of the disclosure are for the purpose of promoting an understanding of the disclosure only and are not intended to be limiting of the disclosure. That is, it will be understood by those of ordinary skill in the art that various changes in form and details may be made therein without departing from the spirit and scope as defined by the following claims. When required, the embodiments of the disclosure may be combined. For example, parts of an embodiment and parts of another embodiment of the disclosure may be combined with one another. Also, modified embodiments of the disclosure based on the technical concept of the embodiments of the disclosure may be executable in another system such as an LTE system, a 5G system, or an NR system.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be used without departing from the scope of the invention, which is defined in the accompanying claims.

The invention claimed is:

1. A method for transmitting a positioning reference signal (PRS) by a base station in a cell in a wireless communication system, the method comprising:
  determining a resource allocation of time and frequency resources for transmission of the PRS in the cell;
  transmitting an indication of the determined resource allocation through a broadcast channel; and
  transmitting the PRS to a terminal device of in a radio resource control (RRC) idle or inactive state in the cell, based on the determined resource allocation,
  wherein the time and frequency resources are divided into one or more channels, including the broadcast channel,
  wherein the resource allocation comprises a PRS comb pattern in which the PRS is mapped every k subcarriers in a frequency domain, where k is 4 or 6, and
  wherein the resource allocation further comprises a periodicity of the PRS, and a wakeup periodicity of the terminal device in the RRC idle or inactive state is two or more times the periodicity of the PRS.

2. The method of claim 1,
  wherein the time and frequency resources are divided into resource blocks of a predetermined size in time and frequency, and
  wherein the resource allocation is based on a minimum resource allocation of one of a partial resource block, a single resource block, or a group of resource blocks.

3. The method of claim 1, wherein the transmitting of the PRS includes transmitting the PRS using at least one of an orthogonal cover code, an interleaving pattern, a scrambling code, or power adjustment.

4. The method of claim 1, wherein the transmitting of the PRS includes periodically transmitting the PRS in the determined resource allocation.

5. The method of claim 1, wherein the determining of the resource allocation and the transmitting of the PRS are performed in response to a request received by the base station from the terminal device in the cell.

6. The method of claim 1, wherein the PRS and at least one of data or control signal are spatially multiplexed.

7. The method of claim 1,
  wherein the PRS is transmitted using a first beamformed beam, and
  wherein at least one of data or control signal is transmitted using a second beamformed beam different from the first beamformed beam.

8. The method of claim 1, wherein the time and frequency resources of the determined resource allocation vary in position in frequency according to a frequency hopping pattern.

9. A method for receiving a positioning reference signal (PRS) by a terminal device in a cell in a wireless communication system, the method comprising:
  receiving, through a broadcast channel, an indication of a resource allocation of time and frequency resources for reception of the PRS in the cell;
  identifying the resource allocation of the time and frequency resources for the reception of the PRS in the cell; and
  receiving, from a base station, the PRS in a radio resource control (RRC) idle or inactive state in the cell, based on the identified resource allocation,
  wherein the time and frequency resources are divided into one or more channels, including the broadcast channel,
  wherein the resource allocation comprises a PRS comb pattern in which the PRS is mapped every k subcarriers in a frequency domain, where k is 4 or 6, and wherein the resource allocation further comprises a periodicity of the PRS, and a wakeup periodicity of the terminal device in the RRC idle or inactive state is two or more times the periodicity of the PRS.

10. The method of claim 9, further comprising:
determining a position measurement based on the received PRS; and
transmitting the determined position measurement to the base station.

11. A base station configured to transmit a positioning reference signal (PRS) in a cell in a wireless communication system, the base station comprising:
a transceiver; and
a processor coupled to the transceiver and configured to:
determine a resource allocation of time and frequency resources for transmission of the PRS in the cell,
transmit an indication of the determined resource allocation through a broadcast channel, and
transmit the PRS to a terminal device in a radio resource control (RRC) idle or inactive state in the cell, based on the determined resource allocation,
wherein the time and frequency resources are divided into one or more channels, including the broadcast channel,
wherein the resource allocation comprises a PRS comb pattern in which the PRS is mapped every k subcarriers in a frequency domain, where k is 4 or 6, and
wherein the resource allocation further comprises a periodicity of the PRS, and a wakeup periodicity of the terminal device in the RRC idle or inactive state is two or more times the periodicity of the PRS.

12. The base station of claim 11, wherein the processor is further configured to determine the resource allocation and transmit the PRS in response to a request received by the base station from the terminal device in the cell.

13. The base station of claim 11, wherein the PRS and at least one of data or control signal are spatially multiplexed.

14. The base station of claim 11,
wherein the PRS is transmitted using a first beamformed beam, and
wherein at least one of data or control signal is transmitted using a second beamformed beam different from the first beamformed beam.

15. A terminal device configured to receive a positioning reference signal (PRS) in a cell in a wireless communication system, the terminal device comprising:
a transceiver; and
a processor coupled to the transceiver and configured to:
receive, through a broadcast channel, an indication of a resource allocation of time and frequency resources for reception of the PRS in the cell,
identify the resource allocation of the time and frequency resources for the reception of the PRS in the cell, and
receive, from a base station, the PRS in a radio resource control (RRC) idle or inactive state in the cell, based on the identified resource allocation,
wherein the time and frequency resources are divided into one or more channels, including the broadcast channel,
wherein the resource allocation comprises a PRS comb pattern in which the PRS is mapped every k subcarriers in a frequency domain, where k is 4 or 6, and
wherein the resource allocation further comprises a periodicity of the PRS, and a wakeup periodicity of the terminal device in the RRC idle or inactive state is two or more times the periodicity of the PRS.

16. The terminal device of claim 15, wherein the processor is further configured to:
determine a position measurement based on the received PRS, and
transmit the determined position measurement to the base station.

* * * * *